US009895003B2

(12) United States Patent
Choi

(10) Patent No.: US 9,895,003 B2
(45) Date of Patent: Feb. 20, 2018

(54) BEDDING SUPPORT ASSEMBLY AND FOLDABLE BED FRAME HAVING SAME

(71) Applicant: Inno-Sports Co., Ltd., Xiamen (CN)

(72) Inventor: Kwan Jun Choi, Xiamen (CN)

(73) Assignee: Inno-Sports Co., Ltd., Xiamen (CN)

( * ) Notice: Subject to any disclaimer, the term of this patent is extended or adjusted under 35 U.S.C. 154(b) by 0 days.

(21) Appl. No.: 15/423,055

(22) Filed: Feb. 2, 2017

(65) Prior Publication Data

US 2017/0215598 A1     Aug. 3, 2017

(30) Foreign Application Priority Data

Feb. 2, 2016   (CN) .................... 2016 2 0103468 U
Feb. 2, 2016   (CN) .................... 2016 2 0103473 U

(51) Int. Cl.

| A47C 19/12 | (2006.01) |
|---|---|
| A47C 21/02 | (2006.01) |
| A47C 19/22 | (2006.01) |
| A47C 19/02 | (2006.01) |
| F16B 12/54 | (2006.01) |

(52) U.S. Cl.
CPC .......... *A47C 21/022* (2013.01); *A47C 19/024* (2013.01); *A47C 19/025* (2013.01); *A47C 19/122* (2013.01); *A47C 19/22* (2013.01); *F16B 12/54* (2013.01)

(58) Field of Classification Search
CPC ....................................................... A47C 19/12

USPC ............. 5/110–112, 118, 425, 151, 154, 131
See application file for complete search history.

(56) References Cited

U.S. PATENT DOCUMENTS 893,364 A  *  7/1908  Piaser .................... A47C 17/48
                                                         5/111

FOREIGN PATENT DOCUMENTS

| CN | 204336376 U | 5/2015 |
|---|---|---|
| CN | 204336377 U | 5/2015 |

* cited by examiner

*Primary Examiner* — Fredrick Conley
(74) *Attorney, Agent, or Firm* — Morgan, Lewis & Bockius LLP

(57) ABSTRACT

Disclosed are adjustable supports, bedding support assemblies, and foldable bed frames having adjustable supports, bedding support assemblies or both. A foldable bed frame includes first and second sub-frames, first and second leg assemblies, and one or more bedding support assemblies to support a bed cloth. First and second sub-frames are pivotally connected to each other at their proximal sides. First and second leg assemblies are pivotally connected with the first and second sub-frames, respectively. A bedding support assembly includes a bedding support, and one or more linking mechanisms to pivotally connect the bedding support with a sub-frame, a leg assembly or both. The bedding support assembly folds and unfolds along with the subframe and the leg assembly.

20 Claims, 9 Drawing Sheets

BEDDING SUPPORT ASSEMBLY AND FOLDABLE BED FRAME HAVING SAME

CROSS-REFERENCE TO RELATED APPLICATIONS

The present application claims priority to Chinese Utility Model Applications CN 201620103473.9 filed Feb. 2, 2016 and CN 201620103468.8 Feb. 2, 2016. The disclosure of each application is incorporated herein for all purposes by reference in its entirety.

FIELD OF THE INVENTION

The present invention generally relates to bed frames and their components. More particularly, the present invention relates to bedding support assemblies, adjustable supports, and foldable bed frames having such bedding support assemblies, adjustable supports, or both.

BACKGROUND

Generally, a foldable bed frame includes two pivotally connected sub-frames, and legs pivotally connected with and supporting the sub-frames. To stabilize the foldable bed frame, legs are usually connected to each other by lateral bars, and lateral bars are connected to sub-frames by supports. In some existing foldable bed frames, supports are made of telescopically coupled bars, with push buttons to unlock the bars so that the bed frames can be folded. In many cases, one has to push the buttons very hard to unlock the bars, making the foldable bed frames inconvenient to use.

Some existing foldable bed frames also include bedding supports configured to be attached to the bed frames after the bed frames are unfolded. Such bedding supports usually work separately and independently, e.g., they cannot be folded or unfolded along with the other components of the bed frames while connected to the bed frames. They have to be detached and removed from the bed frames in order to fold and unfold the bed frames. It is inconvenient and time consuming.

Given the current state of the art, there remains a need for supports, bedding support assemblies, and foldable bed frames that address the abovementioned issues.

The information disclosed in this Background section is provided for an understanding of the general background of the invention and is not an acknowledgement or suggestion that this information forms part of the prior art already known to a person skilled in the art.

SUMMARY OF THE INVENTION

The present invention provides bedding support assemblies and adjustable supports for foldable bed frames and foldable bed frames have such bedding support assemblies and/or adjustable supports.

In various exemplary embodiments, the present invention provides a bedding support assembly for a foldable bed frame. The foldable bed frame includes a sub-frame and a leg assembly pivotally connected with the sub-frame at a distal side of the sub-frame. The leg assembly includes a left leg and a right leg disposed at left and right sides of the foldable bed frame respectively. The bedding support assembly includes a bedding support, and left and right linking mechanisms. The bedding support is disposed below the sub-frame when the foldable bed frame is unfolded, and includes a left segment, a right segment, and a lateral segment between the left and right segments. The left segment is disposed at a left side of the left leg of the leg assembly, the right segment is disposed at a right side of the right leg of the leg assembly, and the lateral segment is disposed at the distal side of the sub-frame. The left linking mechanism pivotally connects the left segment of the bedding support with the left leg of the leg assembly, the sub-frame, or both of the left leg of the leg assembly and the sub-frame. The right linking mechanism pivotally connects the right segment of the bedding support with the right leg of the leg assembly, the sub-frame or both of the right leg of the leg assembly and the sub-frame. Each of the left and right linking mechanisms includes a first link having a first end fixedly coupled to a middle portion of the left or right segment of the bedding support, and a second end pivotally coupled to a middle portion of the left or right leg of the leg assembly.

In some exemplary embodiments, each of the left and right linking mechanisms further includes second and third links. The second link has a first end and a second end, with the first end pivotally connected with the second end of the first link and pivotally connected with the middle portion of the left or right leg of the leg assembly. The third link has a first end pivotally connected with the second end of the second link, and a second end pivotally connected with the sub-frame. In an exemplary embodiment, the second and third links are disposed between the distal end of the sub-frame and the leg of the leg assembly when the foldable bed frame is unfolded. In an embodiment, the second link has a length shorter than the third link.

In some exemplary embodiments, each of the left and right linking mechanisms further includes a fourth link having a first end fixedly connected to an end of the left or right segment of the bedding support, and a second end pivotally connected with the second end of the leg of the leg assembly is between the distal end of the sub-frame, and the fourth link.

In various exemplary embodiments, the present invention provides a foldable bed frame including first and second sub-frames, first and second leg assemblies, and one or more bedding support assemblies of the present invention disclosed herein to support a bed cloth. The first and second sub-frames are pivotally connected to each other at their proximal sides. The first and second leg assemblies are pivotally connected with the first and second sub-frames respectively at distal sides of the first and second sub-frames. Each of the first and second leg assemblies includes left and right legs. The left leg is disposed at a left side of the foldable bed frame and pivotally connected with a corresponding sub-frame in the first and second sub-frames. The right leg is disposed at a right side of the foldable bed frame and pivotally connected with the corresponding sub-frame. Each of the one or more bedding support assemblies includes a bedding support, and left and right linking mechanisms. The bedding support includes a left segment, a right segment, and a lateral segment between the left and right segments. The left segment is disposed at a left side of the left leg of a leg assembly in the first and second leg assemblies, the right segment is disposed at a right side of the right leg of the leg assembly, and the lateral segment is disposed at the distal side of the corresponding sub-frame. The left linking mechanism pivotally connects the left segment of the bedding support with the left leg of the leg assembly, the corresponding sub-frame, or both of the left leg of the leg assembly and the corresponding sub-frame. The right linking mechanism pivotally connects the right segment of the bedding support with the right leg of the leg assembly, the corresponding sub-frame, or both of the right leg of the leg assembly and the corresponding sub-frame. Each of the left and right linking mechanisms includes a first link having a first end fixedly coupled to a middle portion of the left or right segment of the bedding support, and a second end pivotally coupled to a middle portion of the left or right leg of the leg assembly.

In some exemplary embodiments, a foldable bed frame of the present invention further includes a middle leg assembly disposed between the first and second sub-frames, and pivotally connected with both of the first and second sub-frames at the proximal sides thereof.

In some exemplary embodiments, a foldable bed frame of the present invention further includes a plurality of adjustable supports, each having one end connected to the first or second sub-frame, and the other end connected to the corresponding first or second leg assembly. When locked, the plurality of adjustable supports restricts the leg assembly from rotating toward or away from the sub-frame. When unlocked, the plurality of adjustable supports allows the leg assembly to fold or unfold with respect to the sub-frame.

In some exemplary embodiments, each adjustable support in the plurality of adjustable supports includes an inner tubular bar, an outer tubular bar, and a locking and unlocking mechanism. The inner tubular bar has a first restriction hole formed on a side wall of the inner tubular bar. The outer tubular bar is movably coupled to the inner tubular bar, and has a second restriction hole formed on a side wall of the outer tubular bar and corresponding to the first restriction hole of the inner tubular bar. In an exemplary embodiment, the second restriction hole of the outer tubular bar is formed at a proximal end of the outer tubular bar with respect to the inner tubular bar.

The locking and unlocking mechanism is configured to selectively restrict the inner and outer tubular bars from moving with respect to each other. The locking and unlocking mechanism includes a sleeve fitting, a cover, a pin and an elastic member. The sleeve fitting is configured to be sleeved on the outer tubular bar, and has an opening at a side corresponding to the first restriction hole of the inner tubular bar and the second restriction hole of the outer tubular bar. The cover is configured to be fixedly coupled with the sleeve fitting to cover the opening of the sleeve fitting, and includes a pin hole. The pin includes a first end, a second end, and a protrusion between the first and second ends. The first end of the pin is disposed within the sleeve fitting, and the second end passes through the pin hole of the cover and accessible from an outside. The elastic member is sleeved on the second segment of the pin, and has one end abutting the protrusion of the pin and the other end abutting the cover. When the first and second restriction holes of the inner and outer tubular bars are aligned with each other, the elastic member pushes the first end of the pin into the first and second restriction holes of the inner and outer tubular bars, thereby restricting the inner and outer tubular bars from moving with respect to each other, and thus restricting the first or second leg assembly from rotating toward or away from the first or second sub-frame.

In an exemplary embodiment, the locking and unlocking mechanism further includes a pulling means disposed outside of the sleeve fitting and coupled to the second end of the pin. Pulling the pulling means outwardly releases the first end of the pin from the first hole of the inner tubular bar or from both the first and second restriction holes of the inner and outer tubular bars, thereby unlocking the adjustable support to allow the inner and outer tubular bars to move with respect to each other, and thus to allow the first or second leg assembly to fold or unfold with respect to the first or second sub-frame. In a further exemplary embodiment, the pulling means includes a ring.

In some exemplary embodiments, each of the first and second sub-frames includes a frame lateral bar, and each of the first and second leg assemblies further includes a leg lateral bar connecting the left and right legs. In an exemplary embodiment, each adjustable support in the plurality of adjustable supports has the one end pivotally connected with the frame lateral bar and the other end pivotally connected with the leg lateral bar of the first or second leg assembly. The frame lateral bar is a peripheral lateral bar or an interior lateral bar of the corresponding sub-frame.

The bedding support assemblies, adjustable supports, and foldable bed frames of the present invention have other features and advantages that will be apparent from, or are set forth in more detail in, the accompanying drawings, which are incorporated herein, and the following Detailed Description, which together serve to explain certain principles of exemplary embodiments of the present invention.

BRIEF DESCRIPTION OF THE DRAWINGS

The accompanying drawings, which are incorporated into and constitute a part of this specification, illustrate one or more exemplary embodiments of the present invention and, together with the Detailed Description, serve to explain the principles and implementations of exemplary embodiments of the invention.

DETAILED DESCRIPTION

Figure 1:
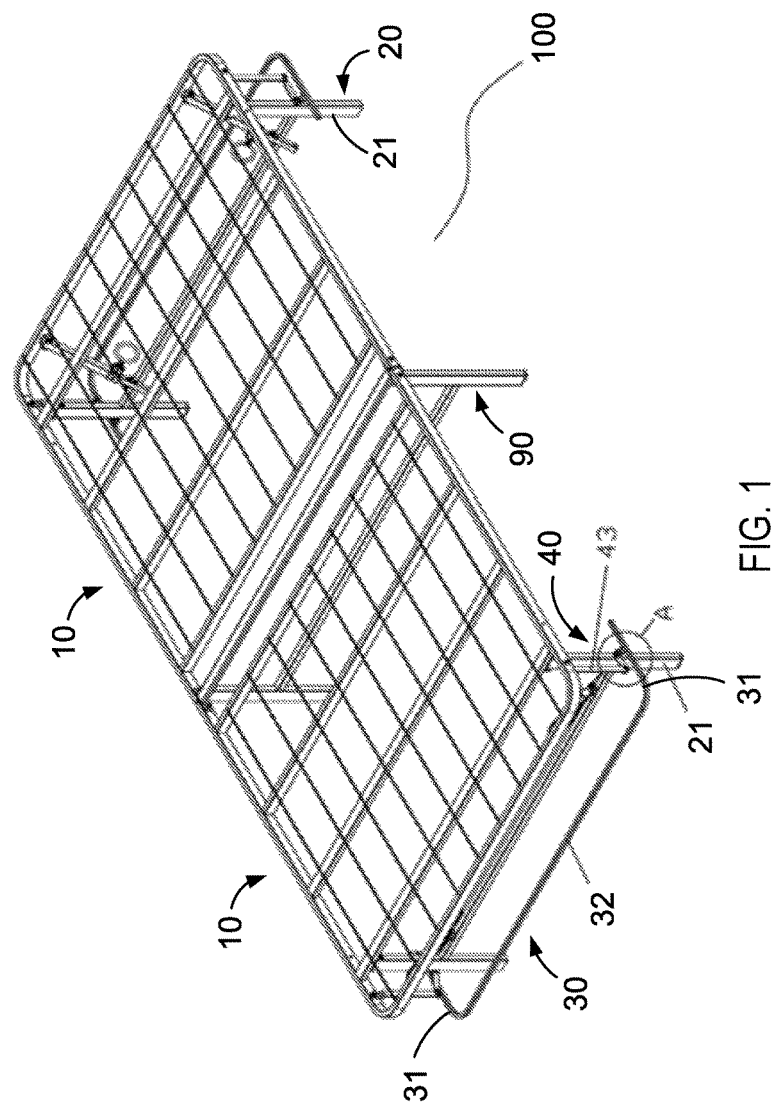
FIG. 1 is a perspective view illustrating an exemplary foldable bed frame in an unfolded state in accordance with exemplary embodiments of the present invention.

Reference will now be made in detail to implementations of exemplary embodiments of the present invention as illustrated in the accompanying drawings. The same reference indicators will be used throughout the drawings and the following detailed description to refer to the same or like parts. Those of ordinary skill in the art will understand that the following detailed description is illustrative only and is not intended to be in any way limiting. Other embodiments of the present invention will readily suggest themselves to such skilled persons having benefit of this disclosure.

In the interest of clarity, not all of the routine features of the implementations described herein are shown and described. It will be appreciated that, in the development of any such actual implementation, numerous implementation-specific decisions are made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Many modifications and variations of the exemplary embodiments set forth in this disclosure can be made without departing from the spirit and scope of the embodiments, as will be apparent to those skilled in the art. The specific exemplary embodiments described herein are offered by way of example only.

Embodiments of the present invention are described in the context of components (e.g., bedding support assemblies, adjustable supports) for foldable bed frames and foldable bed frames having such components. In general, a bedding support assembly of the present invention includes a bedding support configured to be disposed on the head or foot section of a foldable bed frame and pivotally coupled to the foldable bed frame by one or more linking mechanisms. When the bed frame is unfolded and in use, the bedding support assembly supports a bed cloth such as bed coverings, bed linens, bed sheets and bed blankets, in particular along the sides of the bed frame so that the bed cloth does not hang down loosely. In various embodiments, the bedding support assembly of the present invention helps to maintain the bed cloth straight, tight and/or smooth, and thus improves the appearance of the bed.

An adjustable support of the present invention generally includes an inner tubular bar, an outer tubular bar, and a locking and unlocking mechanism. The inner and outer tubular bars are movably coupled to each other. The locking and unlocking mechanism selectively restricts or allows movement of the inner and outer tubular bars with respect to each other, and thus selectively locks or unlocks the adjustable support. Exemplary supports of the present invention can be used in a foldable bed frame, for instance, between a sub-frame and a leg assembly pivotally connected with the sub-frame. When locked, the adjustable support restricts the leg assembly from rotating with respect to the sub-frame, and thus enhances the stability of the bed frame. When unlocked, the adjustable support allows the leg assembly to fold and unfold with respect to the sub-frame.

Figure 3:
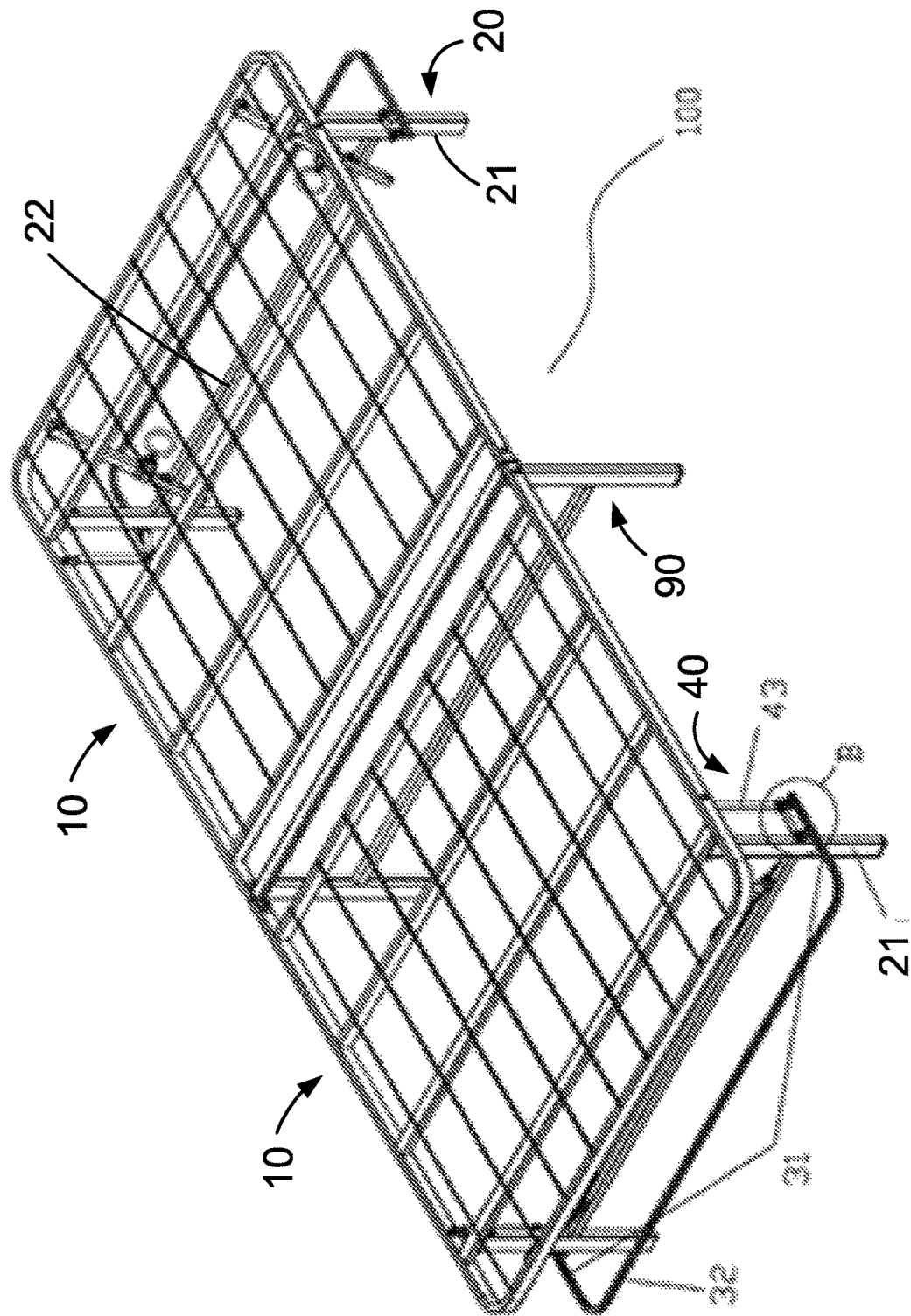
FIG. 3 is a perspective view illustrating an exemplary foldable bed frame having alternative, additional or optional components in an unfolded state in accordance with exemplary embodiments of the present invention.

A foldable bed frame of the present invention in general includes a plurality of pivotally connected sub-frames, and a plurality of leg assemblies pivotally connected to one or more of the sub-frames. The foldable bed frame can be of various sizes including but not limited to twin, full, queen and king sizes, and of various shapes including but not limited to rectangles and squares. They can be made of various materials including but not limited to metals such as steel, plastics and woods. For instance, FIGS. 1 and 3 illustrate an exemplary foldable bed frame 100 including first and second sub-frames 10 pivotally connected to each other at their proximal sides. As used herein, the sides at which first and second sub-frames 10 are connected to each other are referred to as their proximal sides, and the sides opposite the proximal sides are referred to as their distal sides. For instance, in FIGS. 1 and 3, the proximal sides of first and second sub-frames are in the middle of the foldable bed frame. The distal sides correspond to head and foot sections of the bed frame. The other two sides are referred to as left and right sides. It should be noted that the term "middle" as used herein does not necessarily mean the center of the bed frame, and the term "side" does not necessarily mean an outmost edge of the bed frame.

Foldable bed frame 100 also includes first and second leg assemblies 20 disposed respectively at the dismal sides of first and second sub-frames 10, and pivotally connected with the corresponding sub-frame. The leg assemblies support the sub-frames when the foldable bed frame is unfolded. In some embodiments, each of the first and second sub-frames includes left and right legs 21, with the left leg disposed at the left side of the foldable bed frame and pivotally connected with the corresponding sub-frame, and the right leg disposed at the right side of the foldable bed frame and pivotally connected with the corresponding sub-frame.

Referring to FIG. 1, in some embodiments, a foldable bed frame of the present invention includes one or more bedding support assemblies to support bedding such as bed covering(s), bed linen(s), bed sheet(s) or bed blanket(s). A bedding support assembly of the present invention in general includes a bedding support such as bedding support 30 and one or more linking mechanisms such as linking mechanism 40 to pivotally connect the bedding support with a sub-frame, a leg assembly or both of the sub-frame and the leg assembly. In some embodiments, the bedding support assembly is configured to be disposed on the head or foot section of foldable bed frame 100, e.g., the distal side of a corresponding sub-frame. For instance, by way of example, FIG. 1 illustrates two bedding support assemblies with one disposed at the distal side of the first sub-frame and the other at the distal side of the second sub-frame.

In some embodiments, bedding support 30 has substantially a "⊏" shape with two side (e.g., left and right) segments 31 and a middle (e.g., lateral) segment 32 between the two side segments. The left segment is disposed at a left side of the left leg of the leg assembly, and the right segment is disposed at a right side of the right leg of the leg assembly, i.e., both the left and right legs of the leg assembly are in the inner side of the bed frame along the lateral direction of the bed frame. When the foldable bed frame is unfolded, the lateral segment is disposed at the distal side of the corresponding sub-frame and below the sub-frame. In an embodiment, the "⊏" shaped bedding support is made of a bent bar.

Figure 2:
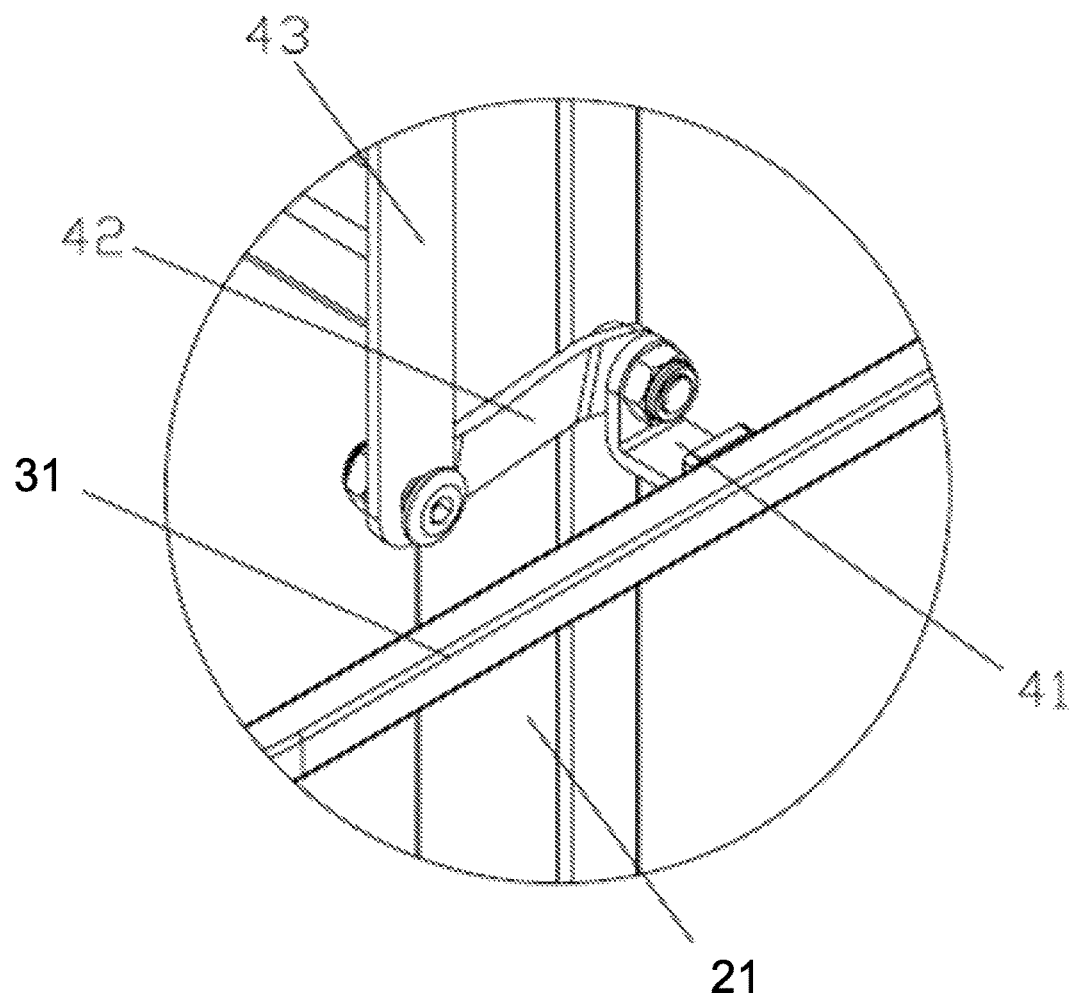
FIG. 2 is an enlarged view taken along circle A of FIG. 1.

The linking mechanisms include left and right linking mechanisms 40. The left linking mechanism pivotally connects the left segment of the bedding support with the left leg of the leg assembly, the sub-frame, or both. The right linking mechanism pivotally connects the right segment of the bedding support with the right leg of the leg assembly, the corresponding sub-frame, or both. The left and right mechanisms can be the same or different from each other. By way of example, FIGS. 1 and 2 illustrate left and right mechanisms being substantially the same or symmetrical to each other.

In various embodiments, each of the left and right linking mechanisms includes a first link such as first link 41 having first and second ends. The first end of first link 41 is fixedly coupled (e.g., by welding, fastening) to a middle portion of side segment 31 (left or right segment) of the bedding support. The second end of first link 41 is pivotally coupled to a middle portion of leg 21 (left or right leg) of the leg assembly.

In some embodiments, each of the left and right linking mechanisms further includes a second link such as second link 42 and a third link such as third link 43. The second link has a first end and a second end, and the third link has a first end and a second end. The first end of the second link is pivotally connected with the second end of the first link and pivotally connected with the middle portion of the left or right leg of the leg assembly. The second end of the second link and the first end of the third link are pivotally connected to each other. The second end of the third link is pivotally connected with the corresponding sub-frame. In some embodiments, the second link has a length shorter than the third link. In an embodiment, the second and third links are disposed between the distal end of the sub-frame and the leg of the leg assembly when the foldable bed frame is unfolded.

Figure 4:
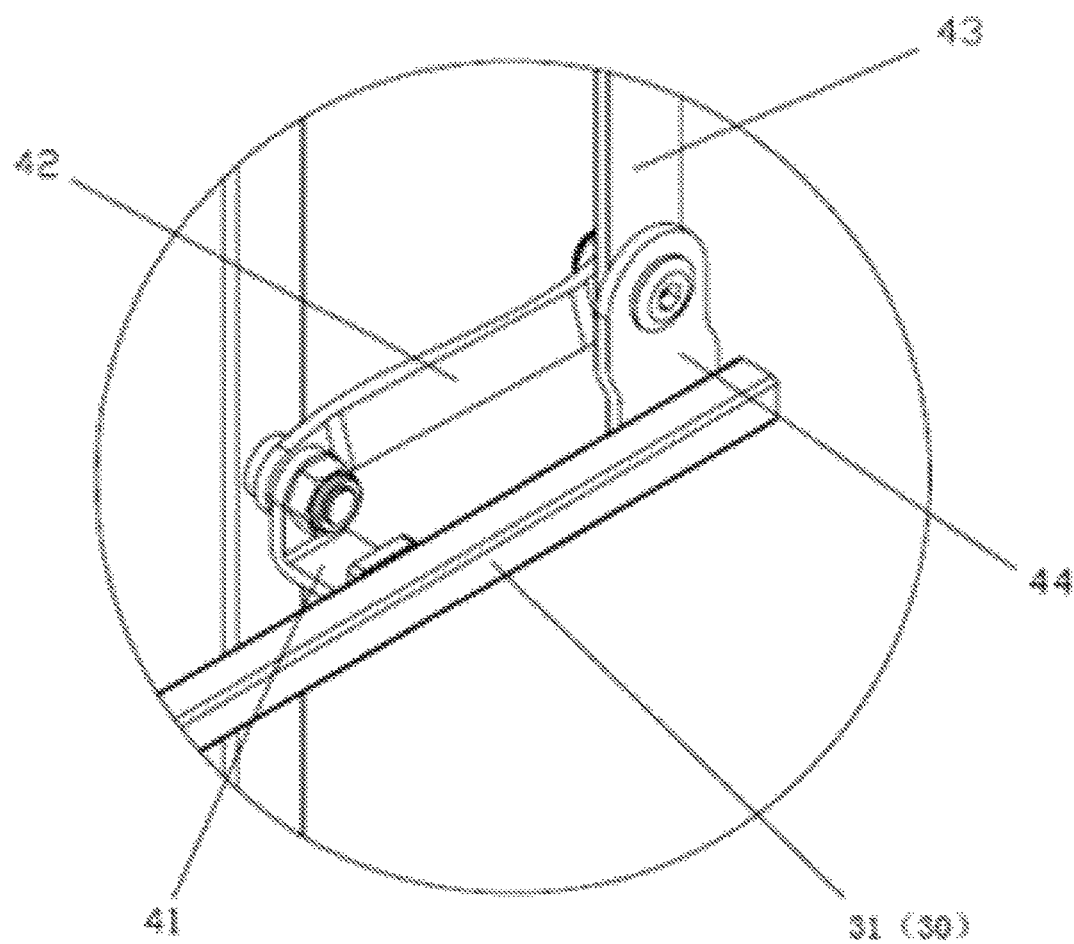
FIG. 4 is an enlarged view taken along circle B of FIG. 2.

In some embodiments, the linking mechanisms include alternative, additional or optional features. For instance, FIGS. 3 and 4 illustrate an exemplary bedding support assembly, in which each of the left and right linking mechanisms further includes a fourth link such as fourth link 44. In some embodiments, fourth link 44 has a first end fixedly connected (e.g., by welding, fastening) to an end of side (left or right) segment 31 of the bedding support, and a second end pivotally connected with the second end of the second link and the first end of the third link. In such embodiments, when the foldable bed frame is unfolded, the leg of the leg assembly is disposed between the distal end of the sub-frame, and the fourth link.

In some embodiments, the linking mechanisms include additional links or plates to help further supporting the bed frame or the bed cloth. For instance, in an embodiment, each of the left and right linking mechanisms further includes a plate pivotally connected to the second link and the sub-frame (e.g., a longitudinal bar of the sub-frame).

Figure 5:
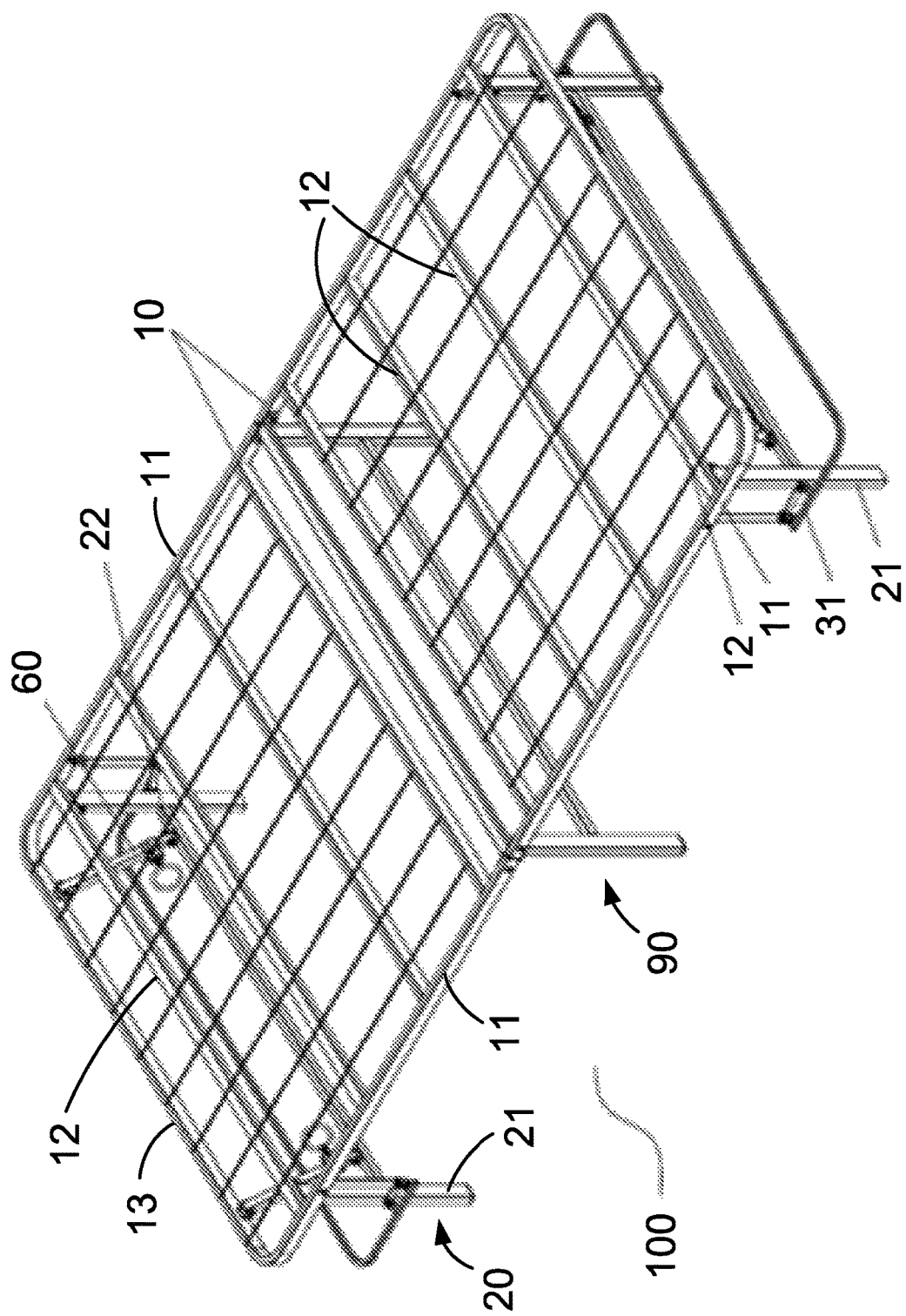
FIG. 5 is another perspective view illustrating the foldable bed frame of FIG. 3.
Figure 7:
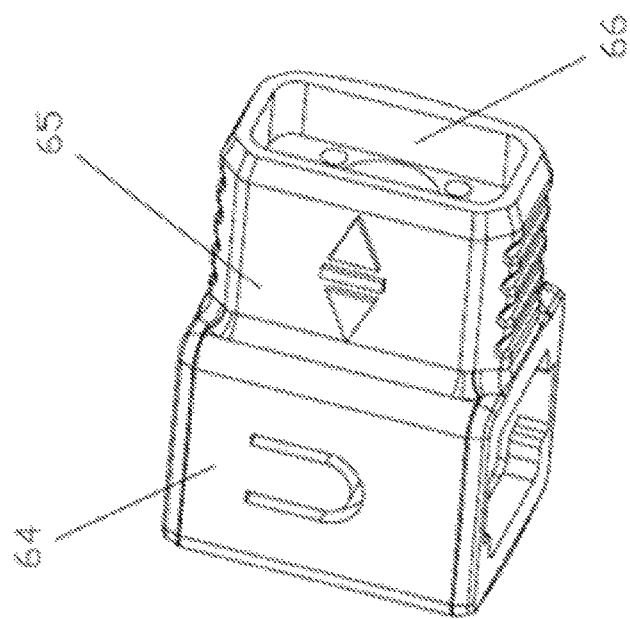
FIG. 7 is a perspective view illustrating a component of the adjustable support of FIG. 6.
Figure 6:
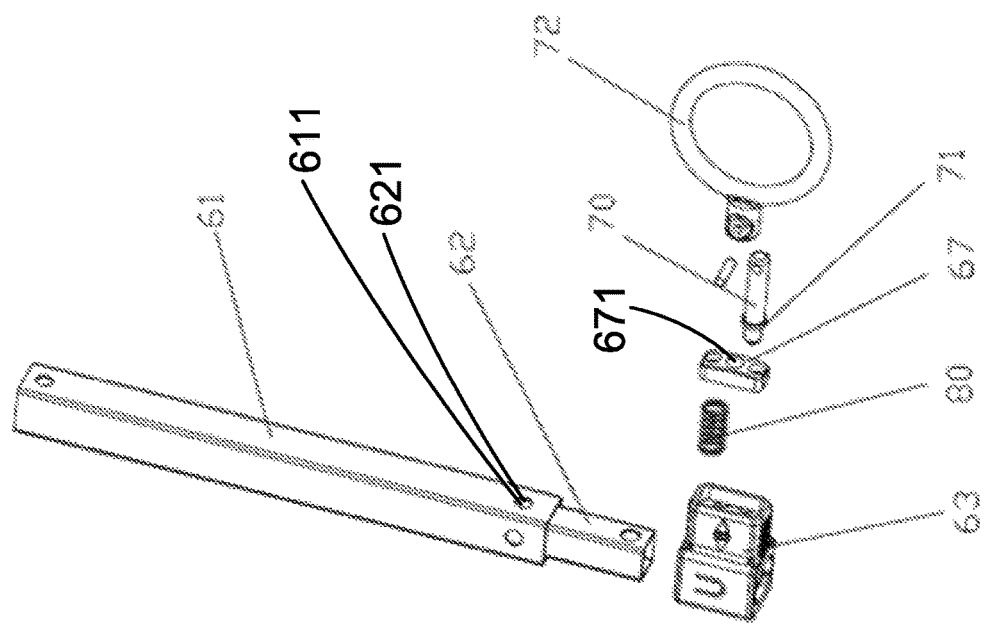
FIG. 6 is a partially disassembled view illustrating an adjustable support in accordance with exemplary embodiments of the present invention.

Referring to FIGS. 5-7, in some embodiments, a foldable bed frame of the present invention includes a plurality of adjustable supports such as adjustable support 60, each having one end connected to a sub-frame and the other end connected to a corresponding leg assembly. The adjustable supports can be selectively locked at certain position(s) to restrict the leg assembly from rotating toward or away from the sub-frame. As a result, the adjustable supports help to stabilize the foldable bed frame when in use. The adjustable supports can be unlocked to allow the leg assembly to fold/unfold with respect to the sub-frame.

It should be noted that a foldable bed frame can include any suitable number of adjustable supports, and the numbers or the positions of adjustable supports for different sub-frames are not necessarily the same. For example, a foldable bed frame can include two adjustable supports for each sub-frame, or can have two adjustable supports for one sub-frame, and three adjustable supports for another sub-frame. Also, it should be noted that the adjustable supports can be connected to the leg assembly and the sub-frame at any suitable positions (symmetric or asymmetric to each other).

In various embodiments, adjustable support 60 includes an inner tubular bar such as inner tubular bar 62 and an outer tubular bar such as outer tubular bar 61 movably coupled to the inner tubular bar. In the illustrated embodiment, the inner and outer tubular bars have substantially square cross-sections. It should be noted that the inner and outer tubular bars can be configured with any suitable cross-sections (e.g., shapes and sizes of the cross-sections), regular or irregular, including but not limited to square, rectangle, circle, oval, and polygons. In some embodiments, inner tubular bar 62 has first restriction hole 621 formed on a side wall of the inner tubular bar. Corresponding to the first restriction hole of the inner tubular bar, outer tubular bar 61 has second restriction hole 611 formed on a side wall of the outer tubular bar. In an embodiment, the second restriction hole of the outer tubular bar is formed at a proximal end (i.e., the lower end in FIG. 6) of the outer tubular bar with respect to the inner tubular bar.

Adjustable support 60 also includes a locking and unlocking mechanism configured to selectively restrict the inner and outer tubular bars from moving with respect to each other. The locking and unlocking mechanism includes a sleeve fitting such as sleeve fitting 63, a cover such as cover 67, a pin such as pin 70 and an elastic member such as elastic member 80. Sleeve fitting 63 is configured to be sleeved on the outer tubular bar, and has an opening side (right hand side in FIGS. 6 and 7) corresponding to the first and second restriction holes of the inner and outer tubular bars. Cover 67 is configured to be fixedly coupled with the sleeve fitting at the opening side of the sleeve fitting. Cover 67 is formed with a pin hole such as pin hole 671. Pin 70 includes a protrusion such as protrusion 71 dividing the pin into a first segment (the segment on the left side of the protrusion in FIG. 6) and a second segment (the segment on the right side of the protrusion in FIG. 6). Protrusion 71 can be a flange, a rim, a collar, a rim or any other suitable shapes. It can be but does not necessarily need to be circumferential. The first end of the pin (the end of the first segment) is disposed within the sleeve fitting. The second end of the pin (the end of the second segment) passes through the pin hole of the cover and accessible from an outside. Elastic member 80 is sleeved on the second segment of the pin, and has one end abutting the protrusion of the pin and the other end abutting the cover. When the first and second restriction holes of the inner and outer tubular bars are aligned with each other, the elastic member pushes the first end of the pin into the first and second restriction holes of the inner and outer tubular bars, thereby restricting the inner and outer tubular bars from moving with respect to each other and thus locking the adjustable support.

In an embodiment, sleeve fitting 63 includes first portion 64 configured to be sleeved on the outer tubular bar, and second portion 65 connected or integrally formed with first portion 64 at the side corresponding to the first and second restriction holes of the inner and outer tubular bars. Second portion 65 includes an opening or a groove such as groove 66 to accommodate cover 67.

In some embodiments, the locking and unlocking mechanism further includes a pulling means such as pulling means 72 disposed outside of the sleeve fitting and coupled to the second end of the pin. The pulling means allows a user to pull the pin outwardly, and thus releases the first end of the pin from the first hole of the inner tubular bar or from both the first and second restriction holes of the inner and outer tubular bars. As such, the adjustable support is unlocked; and the inner and outer tubular bars are allowed to move with respect to each other. In an embodiment, pulling means 72 includes a ring or the like.

Referring to FIGS. 1, 3 and 5, in some embodiments, each sub-frame 10 includes a peripheral frame composed of left and right peripheral longitudinal bars 11 and peripheral lateral bar 13. In some embodiments, each sub-frame 10 also includes one or more interior lateral bars 12 disposed within the peripheral frame and connected to the left and right peripheral longitudinal bars of the peripheral frame. In an embodiment, the one or more interior lateral bars are substantially parallel to the peripheral lateral bar. In some embodiments, each of the first and second leg assemblies includes leg lateral bar 22 having one end connected to the left leg and the other end connected to the right leg.

In various embodiments, adjustable support 60 has one end pivotally connected with the frame lateral bar (e.g., peripheral lateral bar 13 or interior lateral bar 12) and the other end pivotally connected with leg lateral bar 22 of leg assembly 20.

In some embodiments, foldable bed frame 100 further includes a middle leg assembly such as middle leg assembly 90 disposed between the first and second sub-frames, and pivotally connected with both of the first and second sub-frames at their proximal sides.

Figure 8:
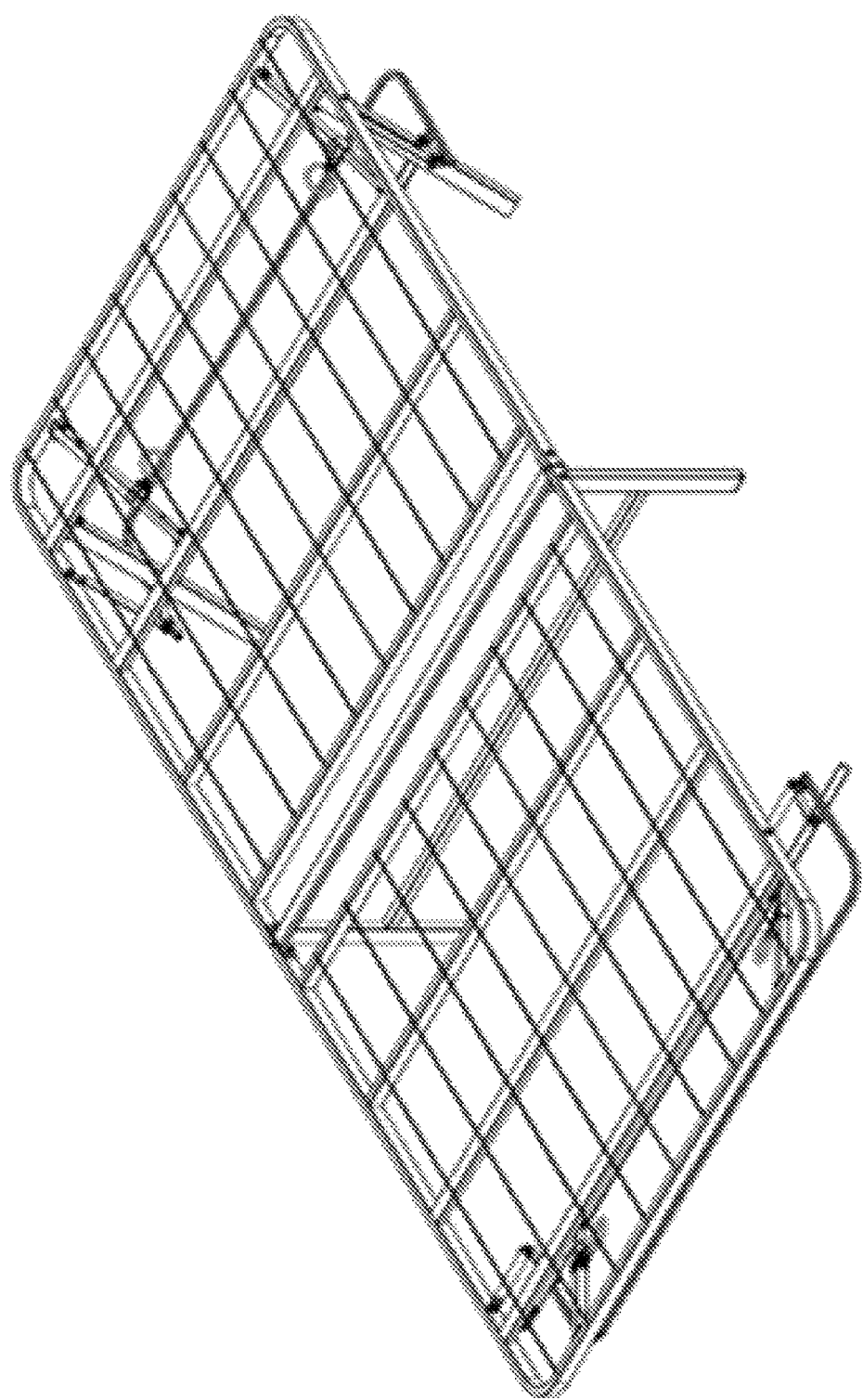
FIG. 8 is a perspective view illustrating the exemplary foldable bed frame of FIG. 3 in a partially folded state in accordance with exemplary embodiments of the present invention.
Figure 9:
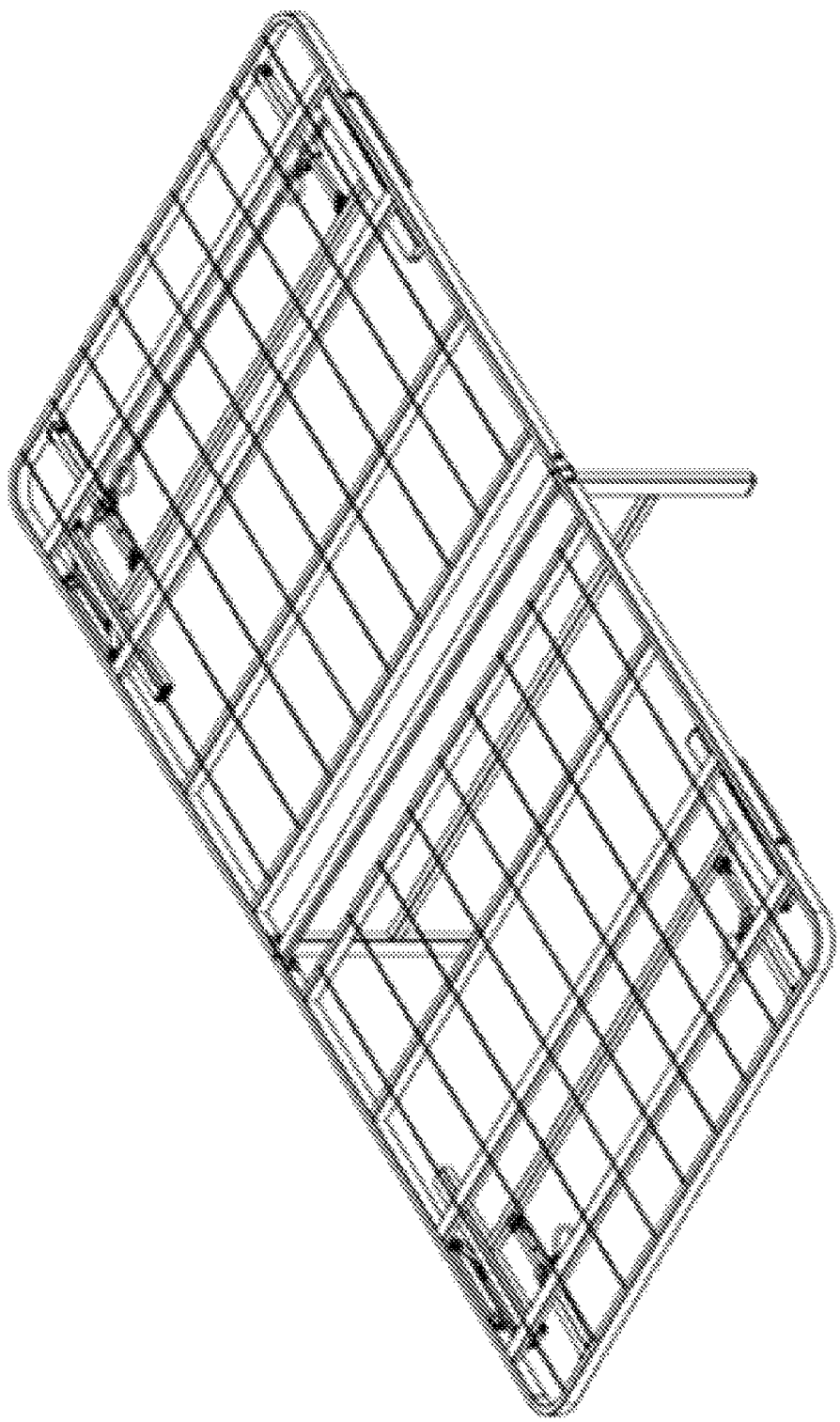
FIG. 9 is a perspective view illustrating the exemplary foldable bed frame of FIG. 3 in another partially folded state in accordance with exemplary embodiments of the present invention.
Figure 10:
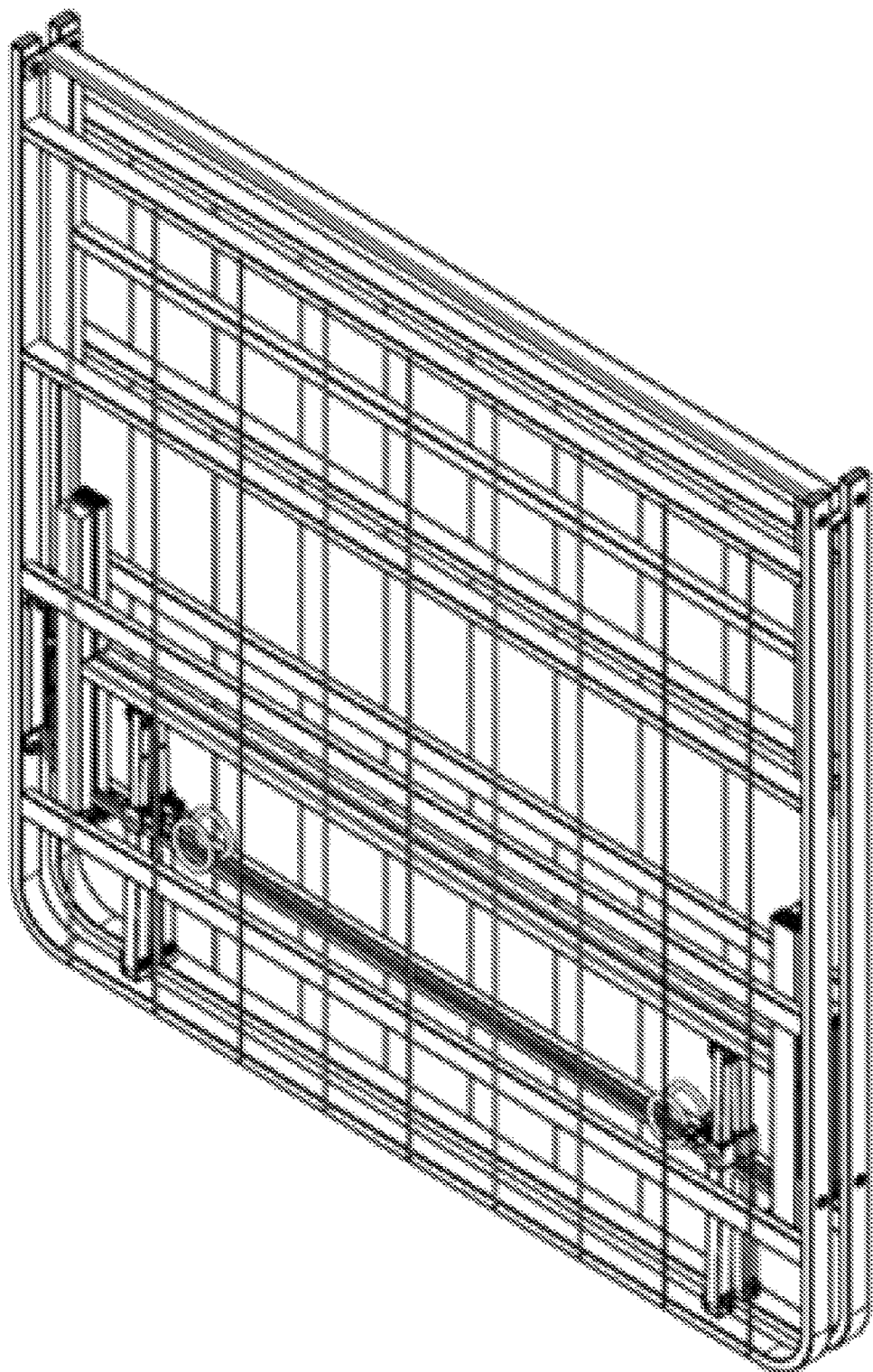
FIG. 10 is a perspective view illustrating the exemplary foldable bed frame of FIG. 3 in a folded state in accordance with exemplary embodiments of the present invention.

Referring to FIGS. 8-9, the foldable bed frame of the present invention is easy and convenient to use. For instance, to fold the bed frame, pull the pulling means to release the pin of the locking and unlocking mechanism from the restriction hole of the outer tubular bar or from the restriction holes of both the inner and outer tubular bars. At this stage, the inner and outer tubular bars are allowed to move with respect to each other, and consequently, the leg assembly is allowed to rotate toward and fold onto the sub-frame. To unfold the bed frame, rotate the leg assembly away from the sub-frame. As one end of the adjustable support is connected to the leg assembly and the other end of the adjustable support is connected to the sub-frame, rotating the leg assembly causes the movement of the inner and outer tubular bars with respect to each other. When the leg assembly is unfolded, the first and second restriction holes of the inner and outer tubular bars are aligned with each other. Pushed by the elastic member, the first end of the pin is inserted into the first and second restriction holes of the inner and outer tubular bars, and thus restricts the inner and outer tubular bars from further movements. At this stage, the sub-frame, the leg assembly and the adjustable support(s) collectively form a triangular structure, making the unfolded bed frame firm and stable. In embodiments where the foldable bed frame includes one or more bedding supports, each bedding support can move along with the corresponding leg assembly, folding to or unfolding from the corresponding sub-frame.

It should be noted that bedding support assemblies and adjustable supports of the present invention can be used in a variety of foldable bed frames and foldable beds, including but not limited to those disclosed in U.S. Publication No. 2016/0316923, the content of which is hereby incorporated by reference herein in their entirety. Also, it should be noted that bedding support assemblies and adjustable supports of the present invention can work independently, e.g., a foldable bed frame of the present invention does not necessarily need to have both bedding support assemblies and adjustable supports of the present invention. For instance, it can include a bedding support assembly of the present invention but not an adjustable support of the present invention, or vice versa. It can also include a bedding support assembly of the present invention, along with any other suitable supports (e.g., adjustable or non-adjustable supports).

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will be understood that the terms "inward" or "outward", and etc. are used to describe features of the exemplary embodiments with reference to the positions of such features as displayed in the figures. It will be understood that, although the terms "first," "second," etc. may be used herein to describe various elements, these elements should not be limited by these terms. These terms are only used to distinguish one element from another. For example, a first sub-frame could be termed a second sub-frame, and, similarly, a second sub-frame could be termed a first sub-frame, without changing the meaning of the description, so long as all occurrences of the "first sub-frame" are renamed consistently and all occurrences of the "second sub-frame" are renamed consistently.

What is claimed is:

1. A bedding support assembly for a foldable bed frame, wherein the foldable bed frame comprises a sub-frame and a leg assembly pivotally connected with the sub-frame at a distal side of the sub-frame, the leg assembly comprises a left leg and a right leg disposed at left and right sides of the foldable bed frame respectively, the bedding support assembly comprising:

a bedding support comprising a left segment, a right segment, and a lateral segment between the left and right segments, wherein the left segment is disposed at a left side of the left leg of the leg assembly, the right segment is disposed at a right side of the right leg of the leg assembly, and the lateral segment is disposed at the distal side of the sub-frame, wherein the left, lateral and right segments correctively forms substantially a "⊐" shape, and wherein when the foldable bed frame is unfolded and in use, the "⊐" shaped bedding support is disposed below the sub-frame and spatially separated from the sub-frame;

a left linking mechanism to pivotally connect the left segment of the bedding support with the left leg of the leg assembly, the sub-frame, or both of the left leg of the leg assembly and the sub-frame; and a right linking mechanism to pivotally connect the right segment of the bedding support with the right leg of the leg assembly, the sub-frame or both of the right leg of the leg assembly and the sub-frame, wherein each of the left and right linking mechanisms comprises a first link having a first end fixedly coupled to a middle portion of the left or right segment of the bedding support, and a second end pivotally coupled to a middle portion of the left or right leg of the leg assembly.

2. A bedding support assembly for a foldable bed frame, wherein the foldable bed frame comprises a sub-frame and a leg assembly pivotally connected with the sub-frame at a distal side of the sub-frame, the leg assembly comprises a left leg and a right leg disposed at left and right sides of the foldable bed frame respectively, the bedding support assembly comprising:

a bedding support disposed below the sub-frame when the foldable bed frame is unfolded, and comprising a left segment, a right segment, and a lateral segment between the left and right segments, wherein the left segment is disposed at a left side of the left leg of the leg assembly, the right segment is disposed at a right side of the right leg of the leg assembly, and the lateral segment is disposed at the distal side of the sub-frame;

a left linking mechanism to pivotally connect the left segment of the bedding support with the left leg of the leg assembly, the sub-frame, or both of the left leg of the leg assembly and the sub-frame; and a right linking mechanism to pivotally connect the right segment of the bedding support with the right leg of the leg assembly, the sub-frame or both of the right leg of the leg assembly and the sub-frame, wherein each of the left and right linking mechanisms comprises:
a first link having a first end fixedly coupled to a middle portion of the left or right segment of the bedding support, and a second end pivotally coupled to a middle portion of the left or right leg of the leg assembly;
a second link having a first end and a second end, wherein the first end of the second link is pivotally connected with the second end of the first link and pivotally connected with the middle portion of the left or right leg of the leg assembly; and
a third link having a first end pivotally connected with the second end of the second link, and a second end pivotally connected with the sub-frame.

3. The bedding support assembly of claim 2, wherein the second and third links are disposed between the distal end of the sub-frame and the leg of the leg assembly when the foldable bed frame is unfolded.

4. The bedding support assembly of claim 2, wherein the second link has a length shorter than the third link.

5. The bedding support assembly of claim 2, wherein each of the left and right linking mechanisms further comprises:
a fourth link having a first end fixedly connected to an end of the left or right segment of the bedding support, and a second end pivotally connected with the second end of the second link and the first end of the third link.

6. The bedding support assembly of claim 5, wherein the leg of the leg assembly is between the distal end of the sub-frame, and the fourth link.

7. A foldable bed frame comprising:
first and second sub-frames pivotally connected to each other at proximal sides thereof;
first and second leg assemblies pivotally connected with the first and second sub-frames respectively at distal sides thereof, each leg assembly comprising:
a left leg disposed at a left side of the foldable bed frame and pivotally connected with a corresponding sub-frame in the first and second sub-frames, and
a right leg disposed at a right side of the foldable bed frame and pivotally connected with the corresponding sub-frame;
one or more bedding support assemblies configured to support a bed cloth, each bedding support assembly comprising:
a bedding support comprising a left segment, a right segment, and a lateral segment between the left and right segments, wherein the left segment is disposed at a left side of the left leg of a leg assembly in the first and second leg assemblies, the right segment is disposed at a right side of the right leg of the leg assembly, and the lateral segment is disposed at the distal side of the corresponding sub-frame, wherein the left, lateral and right segments correctively forms substantially a "⌷" shape, and wherein when the foldable bed frame is unfolded and in use, the "⌷" shaped bedding support is disposed below the sub-frame and spatially separated from the sub-frame;
a left linking mechanism to pivotally connect the left segment of the bedding support with the left leg of the leg assembly, the corresponding sub-frame, or both of the left leg of the leg assembly and the corresponding sub-frame; and
a right linking mechanism to pivotally connect the right segment of the bedding support with the right leg of the leg assembly, the corresponding sub-frame, or both of the right leg of the leg assembly and the corresponding sub-frame,
wherein each of the left and right linking mechanisms comprises a first link having a first end fixedly coupled to a middle portion of the left or right segment of the bedding support, and a second end pivotally coupled to a middle portion of the left or right leg of the leg assembly.

8. A foldable bed frame comprising:
first and second sub-frames pivotally connected to each other at proximal sides thereof;
first and second leg assemblies pivotally connected with the first and second sub-frames respectively at distal sides thereof, each leg assembly comprising:
a left leg disposed at a left side of the foldable bed frame and pivotally connected with a corresponding sub-frame in the first and second sub-frames, and
a right leg disposed at a right side of the foldable bed frame and pivotally connected with the corresponding sub-frame;
one or more bedding support assemblies configured to support a bed cloth, each bedding support assembly comprising:
a bedding support comprising a left segment, a right segment, and a lateral segment between the left and right segments, wherein the left segment is disposed at a left side of the left leg of a leg assembly in the first and second leg assemblies, the right segment is disposed at a right side of the right leg of the leg assembly, and the lateral segment is disposed at the distal side of the corresponding sub-frame;
a left linking mechanism to pivotally connect the left segment of the bedding support with the left leg of the leg assembly, the corresponding sub-frame, or both of the left leg of the leg assembly and the corresponding sub-frame; and
a right linking mechanism to pivotally connect the right segment of the bedding support with the right leg of the leg assembly, the corresponding sub-frame, or both of the right leg of the leg assembly and the corresponding sub-frame,
wherein each of the left and right linking mechanisms comprises:
a first link having a first end fixedly coupled to a middle portion of the left or right segment of the bedding support, and a second end pivotally coupled to a middle portion of the left or right leg of the leg assembly;
a second link having a first end and a second end, wherein the first end of the second link is pivotally connected with the second end of the first link and pivotally connected with the middle portion of the left or right leg of the leg assembly; and
a third link having a first end pivotally connected with the second end of the second link, and a second end pivotally connected with the corresponding sub-frame.

9. The foldable bed frame of claim 8, wherein the second and third links are disposed between the distal end of the corresponding sub-frame and the leg of the leg assembly when the foldable bed frame is unfolded.

10. The foldable bed frame of claim 8, wherein the second link has a length shorter than the third link.

11. The foldable bed frame of claim 8, wherein each of the left and right linking mechanisms further comprises:

a fourth link having a first end fixedly connected to an end of the left or right segment of the bedding support, and a second end pivotally connected with the second end of the second link and the first end of the third link.

12. The foldable bed frame of claim 11, wherein the leg of the leg assembly is between the distal end of the corresponding sub-frame, and the fourth link.

13. The foldable bed frame of claim 8, further comprising:
a middle leg assembly disposed between the first and second sub-frames, and pivotally connected with both of the first and second sub-frames at the proximal sides thereof.

14. A foldable bed frame comprising:
first and second sub-frames pivotally connected to each other at proximal sides thereof;
first and second leg assemblies pivotally connected with the first and second sub-frames respectively at distal sides thereof, each leg assembly comprising:
  a left leg disposed at a left side of the foldable bed frame and pivotally connected with a corresponding sub-frame in the first and second sub-frames, and
  a right leg disposed at a right side of the foldable bed frame and pivotally connected with the corresponding sub-frame;
one or more bedding support assemblies configured to support a bed cloth, each bedding support assembly comprising:
  a bedding support comprising a left segment, a right segment, and a lateral segment between the left and right segments, wherein the left segment is disposed at a left side of the left leg of a leg assembly in the first and second leg assemblies, the right segment is disposed at a right side of the right leg of the leg assembly, and the lateral segment is disposed at the distal side of the corresponding sub-frame;
  a left linking mechanism to pivotally connect the left segment of the bedding support with the left leg of the leg assembly, the corresponding sub-frame or both of the left leg of the leg assembly and the corresponding sub-frame; and
  a right linking mechanism to pivotally connect the right segment of the bedding support with the right leg of the leg assembly, the corresponding sub-frame, or both of the right leg of the leg assembly and the corresponding sub-frame,
  wherein each of the left and right linking mechanisms comprises a first link having a first end fixedly coupled to a middle portion of the left or right segment of the bedding support, and a second end pivotally coupled to a middle portion of the left or right leg of the leg assembly; and
a plurality of adjustable supports, each having one end connected to the first or second sub-frame, and the other end connected to the corresponding first or second leg assembly, wherein when locked, the plurality of adjustable supports restricts the leg assembly from rotating toward or away from the sub-frame, and when unlocked, the plurality of adjustable supports allows the leg assembly to fold or unfold with respect to the sub-frame.

15. The foldable bed frame of claim 14, wherein each adjustable support in the plurality of adjustable supports comprises:
an inner tubular bar having a first restriction hole formed on a side wall of the inner tubular bar;
an outer tubular bar movably coupled to the inner tubular bar, the outer tubular bar having a second restriction hole formed on a side wall of the outer tubular bar and corresponding to the first restriction hole of the inner tubular bar; and
a locking and unlocking mechanism configured to selectively restrict the inner and outer tubular bars from moving with respect to each other, the locking and unlocking mechanism comprising:
  a sleeve fitting configured to be sleeved on the outer tubular bar, and having an opening at a side corresponding to the first restriction hole of the inner tubular bar and the second restriction hole of the outer tubular bar;
  a cover configured to be fixedly coupled with the sleeve fitting to cover the opening of the sleeve fitting, the cover comprising a pin hole;
  a pin comprising a first end, a second end, and a protrusion between the first and second ends, wherein the first end of the pin is disposed within the sleeve fitting, and the second end passes through the pin hole of the cover and accessible from an outside; and
  an elastic member sleeved on the second segment of the pin, and having one end abutting the protrusion of the pin and the other end abutting the cover,
  wherein when the first and second restriction holes of the inner and outer tubular bars are aligned with each other, the elastic member pushes the first end of the pin into the first and second restriction holes of the inner and outer tubular bars, thereby restricting the inner and outer tubular bars from moving with respect to each other, and thus restricting the first or second leg assembly from rotating toward or away from the first or second sub-frame.

16. The foldable bed frame of claim 15, wherein the locking and unlocking mechanism further comprises:
a pulling means disposed outside of the sleeve fitting and coupled to the second end of the pin, wherein pulling the pulling means outwardly releases the first end of the pin from the first hole of the inner tubular bar or from both the first and second restriction holes of the inner and outer tubular bars, thereby unlocking the adjustable support to allow the inner and outer tubular bars to move with respect to each other, and thus to allow the first or second leg assembly to fold or unfold with respect to the first or second sub-frame.

17. The foldable bed frame of claim 16, wherein the pulling means comprises a ring.

18. The foldable bed frame of claim 15, wherein the second restriction hole of the outer tubular bar is formed at a proximal end of the outer tubular bar with respect to the inner tubular bar.

19. The foldable bed frame of claim 15, wherein:
each of the first and second sub-frames comprises a frame lateral bar; and
each of the first and second leg assemblies further comprises a leg lateral bar connecting the left and right legs,
wherein each adjustable support in the plurality of adjustable supports has the one end pivotally connected with the frame lateral bar and the other end pivotally connected with the leg lateral bar of the first or second leg assembly.

20. The foldable bed frame of claim 19, wherein the frame lateral bar is a peripheral lateral bar or an interior lateral bar of the corresponding sub-frame.

* * * * *